Figure 1:
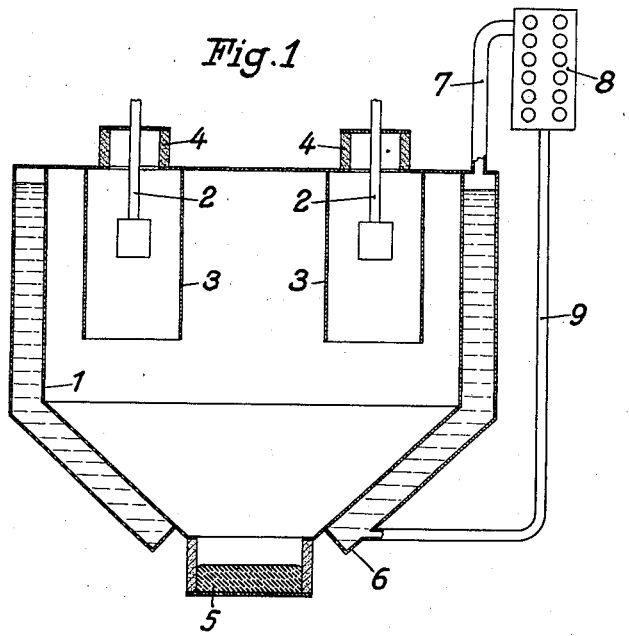

Patented Dec. 29, 1936

2,065,660

UNITED STATES PATENT OFFICE 2,065,660

LIQUID COOLED VACUUM VESSEL

Walter Dällenbach, Berlin, Germany

Application July 9, 1932, Serial No. 621,603
In Germany July 13, 1931

24 Claims. (Cl. 250—27.5)

My invention relates to metallic vacuum vessels which are liquid cooled and relates particularly to metallic vacuum vessels with liquid cooling for vacuum discharge apparatus having mercury cathodes or incandescent cathodes, e. g., mercury vapour rectifiers. Investigations of the gases which are released during the operation of such apparatus have yielded the result that in vessels which are completely vacuum-tight and which have been de-gassed at high temperatures large quantities of hydrogen are released in the vacuum. It was found that this hydrogen is derived from the cooling water, as, so far as I know, they all employ water as the cooling medium. They operate as follows: With increase in temperature the quantity of free hydrogen ions present in the cooling water increases. To a certain extent the water is dissociated into H- and OH-ions. The H-ions or H-atoms have the property of diffusing through iron, steel and most of the ordinary iron alloys used in technology and to pass through the walls of the water jacket into the vacuum chamber as hydrogen gas. This gradual deterioration of the vacuum due to the penetration of the hydrogen has hitherto made it impossible to operate continuously vacuum discharge apparatus with a metallic vacuum vessel without employing a pump to restore the vacuum, and in addition it results in striking back. This striking back occurs more frequently the higher the temperature of the vessel and the longer the apparatus is operated without interruption. Duration of operation and increasing temperature operate in the same way and result in an increase of hydrogen in the interior of and on the surface of the walls of the apparatus. An appreciable deterioration of the vacuum is not of necessity associated therewith because the hydrogen passing into the vacuum is ionized by the discharge and is driven back to or into the walls. However, this participation in the discharge has the result that not only the parts directly cooled by the water but also all parts bounding the vacuum chamber, and the electrodes for example, are covered with hydrogen. As soon as the electric discharge is suspended for a short period there is a sudden deterioration of the vacuum. This rapid deterioration is caused above all by the hot metal components and particularly by the anodes because the hydrogen is given off from metals in the vacuum more readily and rapidly, the higher temperature of the metals. With longer duration of operation at full load the covering with hydrogen can increase to such an extent that finally even during the period of operation during which no current is passed, a material quantity of hydrogen emerges from the anode and causes striking back due to rapid deterioration of the vacuum in the vicinity of the anode.

It is well known that the avoidance of the occurrence of such disturbances is one of the main problems in the construction of vacuum discharge apparatus, such as rectifiers for example.

Now the main object of my invention is to provide means which are adapted to ensure that hydrogen ions cannot diffuse through the walls of the vessel or at the most can diffuse through only to a small extent so that no large collection of hydrogen can occur in the vacuum vessels so as to endanger the operation.

The regulation of the travel of the hydrogen ions is preferably such that at least as much hydrogen escapes through the outer surface of the vessel into the atmosphere as the vacuum chamber takes up from the surrounding parts and particularly from the cooling liquid.

By this systematic restriction of the travel of the hydrogen ions which is now performed for the first time I attain that no deterioration of the vacuum liable to affect the operation detrimentally can occur. As has been shown by experiment the vacuum discharge apparatus can consequently be operated continuously without a pump, assuming that the vacuum vessel is non-porous and has been de-gassed at high temperature.

According to my invention I can utilize various groups of precautions for regulating the travel of the hydrogen ions.

Thus a further object of my invention is to make the liquid-cooled walls of the vacuum vessel from a material which will be metallic but which will not take up or diffuse hydrogen ions to any appreciable extent.

The second group of precautions constitutes a further feature of my invention. This resides in utilizing as cooling liquid of that type of vacuum vessel a liquid which will contain no free hydrogen ions at all.

A further feature of my invention is constituted by the third group of the precautions in question. This resides in that separate chambers are provided for the cooling liquid and the walls of these chambers, insofar as they are in intimate metallic contact with the walls of the vacuum vessel, consist of a material which will not diffuse hydrogen ions if it takes up or absorbs hydrogen ions at all, does so, at the most, to the very smallest extent imaginable.

Zinc, aluminium and chromium come into consideration by way of example as materials which do not take up hydrogen ions at all or take them up only to a very small degree when in contact with the cooling water, and thus serve well for the liquid cooled portions of the walls. Iron, when it is alloyed with a sufficiently high percentage of one or more of these metals, can also be used. Experiments have shown that an addition of 1% of chromium reduces the absorptive capacity of the walls to about 1/100th of that of pure iron. The permeability can be reduced further in a corresponding manner by increasing the chromium content.

Carbon disulphide, toluol, benzol, xylol, non-acidic oils, that is, those containing no free acids or hydrogen ions and not dissociating into such and many others come into consideration as cooling liquids which contain no free hydrogen ions, the cooling liquids preferably having small dielectric constants. The further choice of the cooling liquid is determined by the mode of cooling. According as to whether cooling is effected with forced circulation, with free convection or with boiling liquid the choice must be different as will be understood by the expert in order to attain the greatest possible cooling action.

If such cooling liquids without free hydrogen ions are used then the walls of the vessel can be made of other materials than those postulated herein, that is, can then be made from materials which are capable of taking up or diffusing hydrogen ions. This frequently affords the advantage of greater cheapness.

In the accompanying drawing Figure 1 shows a cooling system utilizing boiling liquid associated with a rectifier by way of example.

1 is the vacuum vessel, 2 are the anodes which are surrounded by the anode sleeves 3 and are introduced through the lead-in members 4, and 5 is the cathode. The vacuum vessel, the walls of which are of iron for example, is surrounded by a cooling cover 6 containing the cooling medium which may be benzol for example, which makes it possible to use the iron. The benzol vapours occurring on boiling rise in the pipe 7 and pass to the condenser 8 where they condense and the benzol then flows back through the conduit 9 into the cooling chamber.

In order to avoid chemical reactions of the cooling liquid which might give rise to the formation of free hydrogen ions, it is desirable to prevent contact between the cooling liquid and materials which react chemically therewith. In particular it may be advantageous to shut off the cooling liquid from the atmosphere continuously in a tight or vacuum-tight manner as indicated in the embodiment of Fig. 1. In addition special means can be provided to absorb impurities containing free hydrogen ions, for example it is always possible to remove any water which may unintentionally be occluded in the cooling medium, from the cooling liquid, by adding drying agents to the suspected non-hydrous liquid, such as phosphorous-pentoxide.

If water must be used instead of one of the preferred media, for reducing the hydrogen ion content, use can also be made of the fact that by adding bases to the water the hydrogen ion content of the water can be strongly reduced. In this way it is possible to reduce the quantity of hydrogen diffusing through a partition to the 1/100th part and less. This method is particularly desirable in converting existing plants having water cooling and re-cooling into a plant according to the present invention. It is sufficient to add potash or soda-lye to the cooling water in them to attain an extremely marked reduction of the travel of the hydrogen ions.

It can be determined by simple calculation to what extent the bases must be added to these old plants to attain a definite reduction in concentration; for example in an aqueous solution of 1 mol. NaOH per litre the concentration of hydrogen ions is about $10^7$ times smaller than in pure water at the same temperature.

The addition of ammonia to convert the old plants is of particular advantage as then it is never possible for pure water to condense but this immediately is enriched by the ammonia which is always available in the gas space.

The third group of precautions which has already been mentioned resides in that when water is used and the walls of the vacuum vessel are made of a material which takes up hydrogen ions when immersed in water such as unalloyed iron or steel, the cooling liquid circulates in separate chambers, the walls of which insofar as they are in intimate metallic contact with the walls of the vacuum vessel either are of the kind which do not take up hydrogen ions from the cooling liquid at all or only to a sufficiently reduced extent. By intimate metallic contact is meant any irreleasable metallic connection such as welding or soldering. It has been found that the hydrogen diffuses over an ordinary connection and travels over large distances of connected metallic parts.

The separate chambers for the cooling liquid can be made of a material such as aluminium, zinc or chromium, which do not take up any hydrogen ions. For example serpentines with pipes of zinc, aluminium or chromium can be used.

Figure 2:
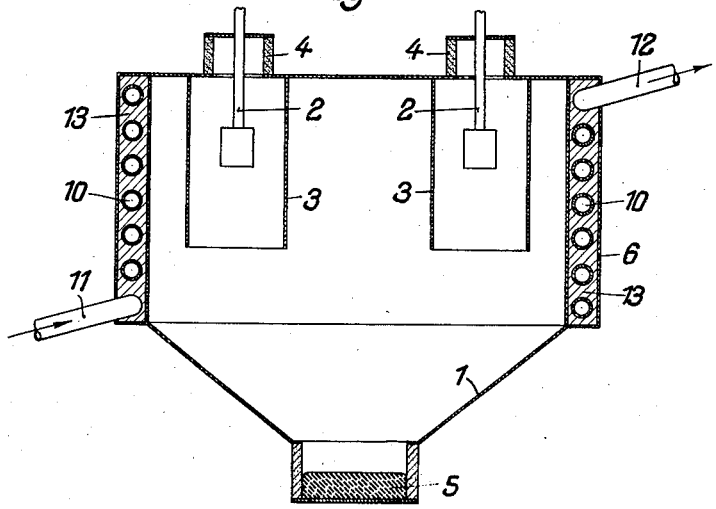

One embodiment of such a cooling arrangement is shown in Fig. 2. Cooling pipes 10 of aluminium, zinc or chromium are accommodated in the cooling chamber closed by the cooling cover 6. The water serving as cooling liquid is fed in through the conduit 11 and passes out through the conduit 12. The part 13 of the cooling chamber which is not occupied by the pipes 10 is filled by casting in, tin for example. In this way an intimate metallic contact is afforded between the walls of the vessel and the cooling pipes 10 which take up no hydrogen ions.

A further solution to the problem resides in furnishing the walls of the cooling chambers, insofar as they are in intimate metallic contact with the walls of the vacuum vessel 1, with a vacuum tight coating of a material such as aluminium, zinc, chromium, enamel, lacquer or the like material which takes up no hydrogen ions from the cooling liquid.

For the rest this can be put into practice in precisely the manner shown in the cooling arrangement of Fig. 2. Pipes of iron or the like with a vacuum-tight coating are used instead of the cooling pipes of aluminium.

It is to be noted that the customary coatings to prevent rusting are in no way vacuum tight. Consequently it is necessary to prepare special vacuum tight coatings with extreme care as the purpose of the invention can only be attained in this way.

Furthermore the experiments which have been made have demonstrated that the taking up or not of hydrogen ions by a metallic wall from distilled water or from water from the mains is determined by what occurs in the boundary surface between the water and the metal. Hydrogen ions can also travel in the interior of so-called non-absorptive metals such as zinc if they are introduced in a forced manner for example by ionization of the hydrogen in a gas discharge; such metals, however, cannot take up any hydrogen from the water without the use of additional electrical energy. This affords the advantage that any hydrogen which may be present within the vessel is gradually driven out through the walls of the vessel whereas fresh hydrogen cannot penetrate. The taking up of the hydrogen into the interior of the metal is undoubtedly the result of electrolytic actions at the boundary surface. This point of view is also supported by the fact that a metal such as copper which in itself has but small capacity for absorption exhibits a considerable capacity if its surface is not sufficiently clean.

Thus it follows that the outer surface must be kept clean as impurities result in an increased capacity for taking up hydrogen.

My invention is not to be regarded as limited to the examples disclosed but includes also all embodiments operating on the same principle.

What I claim is:—

1. A current rectifier apparatus comprising a metal vacuum vessel made up of several parts, anodes and a cathode therein, the parts making up said vacuum vessel being free from gases by reason of having been heated to high temperatures, a cooling chamber surrounding said vacuum vessel, and a cooling liquid in said cooling chamber, said cooling liquid being substantially free from hydrogen ions whereby the hydrogen gas entering the vacuum vessel through the cooling chamber walls is substantially zero and the rectifier is thus adapted to be driven continuously pumpless.

2. In a current rectifier according to claim 1, said cooling liquid being carbon disulfide.

3. In a current rectifier according to claim 1, said cooling liquid being an aqueous solution of bases.

4. In a current rectifier according to claim 1, said cooling liquid being an aqueous solution of ammonia.

5. In a current rectifier according to claim 1, said cooling liquid being xylol.

6. In a current rectifier apparatus comprising a metal vacuum vessel made up of several parts, anodes and a cathode therein, the parts making up said vessel being free from gases by reason of having been heated to high temperatures, a cooling chamber surrounding said vacuum vessel, and a cooling liquid in said cooling chamber, said cooling liquid being substantially free from hydrogen ions and having a substantially small dielectric constant whereby the hydrogen gas entering the vacuum vessel through the cooling chamber walls is substantially zero and the rectifier is thus adapted to be driven continuously pumpless.

7. In a current rectifier apparatus comprising a metal vacuum vessel made up of several parts, anodes and a cathode therein, the parts making up said vessel being free from arc interrupting gases by reason of having been heated to high temperatures, a cooling chamber surrounding said vacuum vessel, and a cooling liquid in said cooling chamber, said cooling liquid being substantially free from hydrogen ions and containing hygroscopic materials for absorbing water whereby the hydrogen gas entering the vacuum vessel through the cooling chamber walls is substantially zero and the rectifier is thus adapted to be driven continuously pumpless.

8. A current rectifier apparatus comprising a metal vacuum vessel made up of several parts, anodes and a cathode therein, the parts making up said vacuum vessel being free from arc interrupting gases by reason of having been heated to high temperatures, a cooling chamber surrounding said vacuum vessel, and a cooling liquid in said cooling chamber, said cooling liquid being substantially free from hydrogen ions whereby the hydrogen gas entering the vacuum vessel through the cooling chamber walls is substantially zero and the rectifier is thus adapted to be driven continuously pumpless.

9. In a current rectifier according to claim 8, said cooling liquid being an aqueous solution of bases.

10. In a current rectifier according to claim 8, said cooling liquid being carbon disulfide.

11. In a current rectifier according to claim 8, said cooling liquid being an aqueous solution of ammonia.

12. In a current rectifier according to claim 8, said cooling liquid being xylol.

13. A current rectifier apparatus comprising a metal vacuum vessel consisting of one or more wall sections welded together, anodes and a cathode therein, all the parts of said vessel being free from arc interrupting gases by reason of having been highly heated, a closed cooling chamber surrounding said vacuum vessel and in contact therewith, and a cooling liquid in said chamber, said cooling liquid being substantially free from hydrogen ions and having a substantially small dielectric constant whereby the hydrogen gas entering the vacuum vessel through the cooling chamber walls is substantially zero and the rectifier is thus adapted to be driven continuously pumpless.

14. A current rectifier apparatus comprising a metal vacuum vessel consisting of one or more wall sections welded together, anodes and a cathode therein, all the parts of said vessel being free from arc interrupting gases by reason of having been highly heated, a closed cooling chamber surrounding said vacuum vessel and in contact therewith, and a cooling liquid in said chamber, said cooling liquid being substantially free from hydrogen ions and containing hygroscopic material for absorbing water whereby the hydrogen gas entering the vacuum vessel through the cooling chamber walls is substantially zero and the rectifier is thus adapted to be driven continuously pumpless.

15. A current rectifier apparatus comprising a metal vacuum vessel, anodes and a cathode therein, a closed circuit boiling cooler surrounding said vessel, a cooling liquid within said boiling cooler, said liquid being substantially free from hydrogen ions, whereby the vacuum within the chamber is not destroyed by the diffusion of hydrogen ions through the walls thereof and the apparatus is adapted to be driven continuously pumpless.

16. In a current rectifier according to claim 15, said cooling liquid being carbon disulfide.

17. In a current rectifier according to claim 15, said cooling liquid being an aqueous solution of bases.

18. In a current rectifier according to claim 15, said cooling liquid being an aqueous solution of ammonia.

19. In a current rectifier according to claim 15, said cooling liquid being xylol.

20. In a current rectifier according to claim 15, said cooling liquid having a substantially small dielectric constant.

21. In a current rectifier according to claim 15, said cooling liquid containing hygroscopic materials for absorbing water.

22. In a current rectifier according to claim 15, and means for protecting the cooling liquid from substances which can chemically react therewith.

23. In a current rectifier according to claim 15, said boiling cooler being hermetically sealed from the atmosphere.

24. In a current rectifier according to claim 15, a pipe line extending between the upper and lower portions of said boiling cooler, and a condenser in said pipe line for condensing vapors passing out of said boiling cooler.

WALTER DÄLLENBACH.